No. 810,755. PATENTED JAN. 23, 1906.
N. HEGG.
HORSESHOE CALK.
APPLICATION FILED JUNE 15, 1905.

WITNESSES
M. McInnis
C. McNamara

INVENTOR
NELS HEGG
BY
Paul & Paul
HIS ATTORNEYS

UNITED STATES PATENT OFFICE.

NELS HEGG, OF HARMONY, MINNESOTA.

HORSESHOE-CALK.

No. 810,755.  Specification of Letters Patent.  Patented Jan. 23, 1906.

Application filed June 15, 1905. Serial No. 265,394.

*To all whom it may concern:*

Be it known that I, NELS HEGG, of Harmony, Fillmore county, Minnesota, have invented certain new and useful Improvements in Horseshoe-Calks, of which the following is a specification.

My invention relates to calks for use on any style or type of horseshoe, but particularly adapted for draft-horses.

The object of my invention is to provide a calk which can be easily and quickly placed on the shoe or removed without taking the shoe off the horse's foot.

The invention consists generally in providing the heel of the shoe with threaded studs or extensions adapted to enter sockets in the shoe-calk and having lock-nuts for locking the calk securely on the stud.

Figure 4:
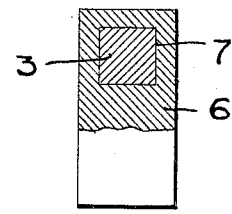
Figure 1:
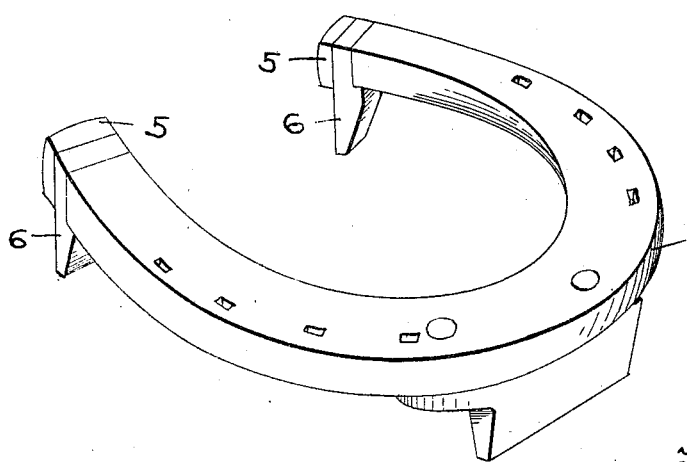
Figure 3:
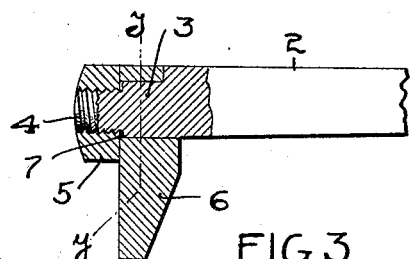
Figure 2:
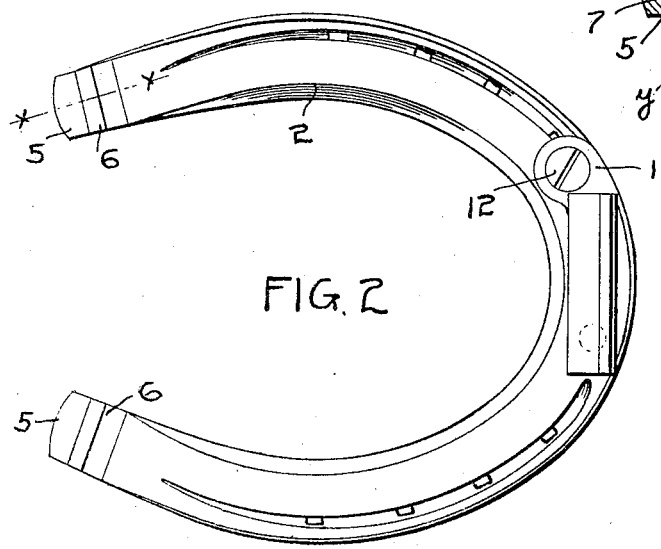
Figure 5:
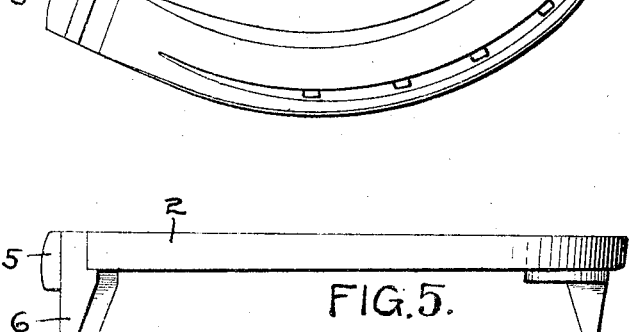

In the accompanying drawings, forming part of this specification, Figure 1 is a perspective view of a horseshoe with my invention applied thereto. Fig. 2 is a bottom view of the same. Fig. 3 is a detail sectional view on the line $x\,x$ of Fig. 2. Fig. 4 is a sectional view on the line $y\,y$ of Fig. 3, and Fig. 5 is an edge view of the shoe.

In the drawings, 2 represents a horseshoe adapted particularly for a draft-horse, the heel of the shoe terminating on each side in a squared shank 3, having a threaded extension 4 for a lock-nut 5. The calk 6 has a square socket 7 to receive the shank 3, and the calk is held on the shank by means of the lock-nut 5 and can be readily placed thereon or removed without taking the shoe off the horse's foot. The end of the calk 6 is wedge-shaped, as shown, and mounted on the shoe substantially at right angles to the draft-line, and therefore forms a wide edge to dig into the ice and prevent the horse from slipping while drawing the load. The ordinary removable toe-calk has a round point, and, while suitable for driving or racing horses, is not adapted for a draft-horse, where it is necessary for the calk to have a broad contact on the ice or snow to prevent slipping. The shanks 3 project a sufficient distance beyond the hoof to allow the calks to be readily removed or placed on the shoe without in any way disturbing the position of the shoe on the hoof. The calks are provided with recesses on one side, as shown in Fig. 1, forming shoulders which support the heel of the shoe and relieve the shank of a considerable portion of the strain.

I claim as my invention—

1. The combination, with a horseshoe provided on its heel with a threaded extension, of a calk having a socket to receive said extension, and a lock-nut for said extension, substantially as described.

2. The combination, with a horseshoe having its heel terminating in a squared shank, of a calk having a wedge-shaped wearing-surface and a socket to receive said shank, said calk having a recess on one side forming a shoulder and a bearing-surface for the heel of the shoe, and means for securing said calk on said shank.

In witness whereof I have hereunto set my hand this 9th day of June, 1905.

NELS HEGG.

Witnesses:
JAS. S. JACOBSON,
IVAR HALVORSON.